United States Patent [19]

Kume

[11] Patent Number: 4,506,361

[45] Date of Patent: Mar. 19, 1985

[54] RETRANSMISSION CONTROL SYSTEM

[75] Inventor: Hiroshi Kume, Kanagawa, Japan

[73] Assignee: Fuji Xerox Co., Ltd., Tokyo, Japan

[21] Appl. No.: 513,586

[22] Filed: Jul. 14, 1983

[30] Foreign Application Priority Data

Jul. 14, 1982 [JP] Japan ................... 57/121230

[51] Int. Cl.³ .............................. H04J 6/00
[52] U.S. Cl. ................... 370/85; 340/825.5
[58] Field of Search .............. 370/85, 94; 340/825.5

[56] References Cited

U.S. PATENT DOCUMENTS

| | | | |
|---|---|---|---|
| 3,878,512 | 4/1975 | Kobayashi et al. | 370/85 |
| 4,063,220 | 12/1977 | Metcalfe et al. | 340/825.5 |
| 4,234,952 | 10/1980 | Gable et al. | 370/85 |
| 4,281,380 | 7/1981 | DeMesa et al. | 340/825.5 |
| 4,292,623 | 9/1981 | Eswaran et al. | 370/85 |
| 4,332,027 | 5/1982 | Malcolm et al. | 370/85 |
| 4,337,465 | 6/1982 | Spracklen et al. | 370/85 |
| 4,380,761 | 4/1983 | Boggs | 370/85 |
| 4,412,326 | 10/1983 | Limb | 370/85 |

Primary Examiner—Douglas W. Olms
Assistant Examiner—Kenneth I. Rokoff
Attorney, Agent, or Firm—Sughrue, Mion, Zinn, Macpeak and Seas

[57] ABSTRACT

A signal retransmission control circuit for stations of a multi-station digital communications network interconnected in a time division manner through a communication cable. The retransmission control circuit detects signal collisions when two or more stations simultaneously transmit their signals and in response to this detection of signal collision initiates a signal retransmission waiting time, during which the signal cannot be transmitted. The control circuit further includes a waiting time adjustment means for increasing the waiting time if another station begins signal transmission during a waiting time period.

5 Claims, 8 Drawing Figures

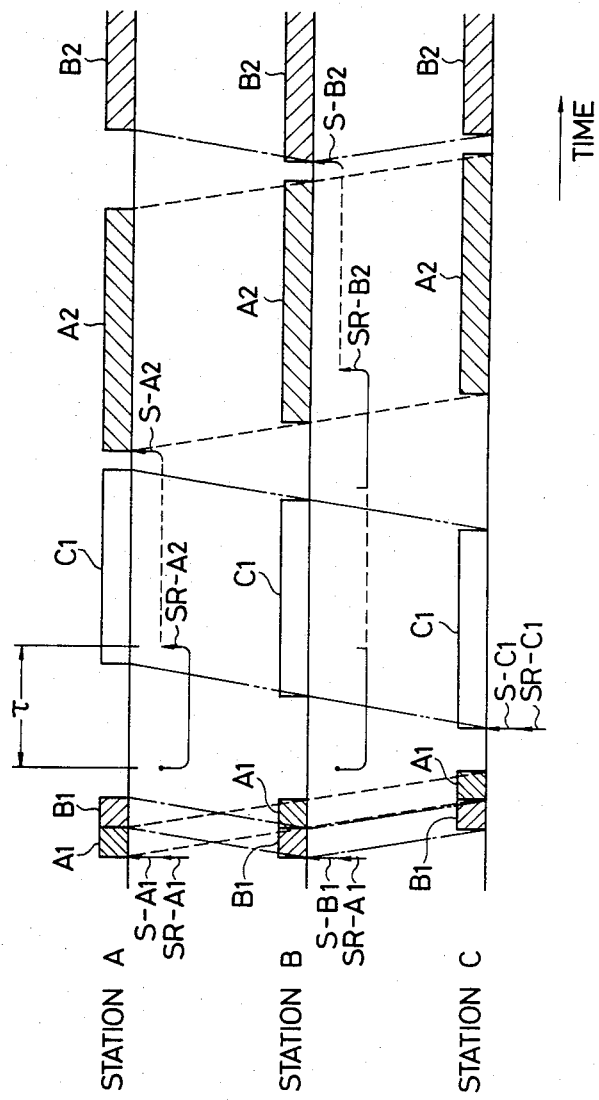

RETRANSMISSION CONTROL SYSTEM

BACKGROUND OF THE INVENTION

This invention relates to a system for controlling retransmission of data when, in a digital signal transmitting system in which communication is carried out in a packet mode using a communication cable such as a coaxial cable, data sent to the communication cable collide with each other.

As electronic computers have come into wide use and digital signal processing techniques have been developed, data communication is spotlighted in which the communication system and the data processing system are combined, to process data on line. Especially in small scale communication systems such as those in government and public offices or companies, the packet type communication system using a communication cable such as a coaxial cable is watched with keen interest because it is economical, high in reliability and transmission efficiency.

In the packet type communication system, for two-way transmission, a communication cable is installed at a laboratory or the like, and a number of stations (personal stations) are connected to the cable. Each station transmits a message which is divided into data blocks of 1,000 to 2,000 bits for instance. The message is provided with a header including a destination, message number, etc. In the communication system, the network itself is a passive transmission medium having no control function, and therefore the control is distributed to the stations. Accordingly, to access a channel, each station confirms that the transmission path is not being used before it starts transmitting signals. When the packet signal of one station collides with that of another station, these two stations stop transmitting the signals, and try to transmit the signals again after random periods of time. A system for controlling retransmission of messages as described above is called "a retransmission control system."

A variety of retransmission control systems have been proposed in the art. FIG. 1 is a diagram of one of the most famous of these systems, namely, a binary exponential back-off protocol (hereinafter referred to as "a BEB protocol"). It is assumed that stations A, B and C are arranged on a communication cable at predetermined intervals in the stated order. Each station detects the presence or absence of a carrier, to determine whether or not a packet having a message is being transmitted on the communication cable. It is assumed that stations A and B internally provide requests for transmitting messages (hereinafter referred to as "transmission request") SR-A1 and SR-B1 at substantially the same time. If, at that time instant, none of the stations transmit packets, then stations A and B immediately start packets A1 and B1 (as indicated at S-A1 and S-B1), respectively. The packet A1 of station A is delayed when propagated over the coaxial cable. Therefore, the packet A1 is received by the station B after a first time interval and is received by the station C after a second time interval longer than the first. Similarly, the packet B1 of station B is received by stations A and C after ceratin time delays.

Each station has a collision detecting circuit for detecting when packets collide with each other. When the collision occurs, the stations A and B immediately stop transmitting their packets and then try to retransmit their packets after predetermined waiting periods of time.

In the BEB protocol, a station with which the collision has taken place is allowed to look for an empty block in which to transmit its packet after a predetermined retransmission interval $t_1$. The retransmission interval $t_1$ is represented by the following expression (1):

$$t_1 = \tau \cdot n \tag{1}$$

where $\tau$ is the time unit for the retransmission interval, being called "slot time," and n is an interger in the range which is defined by the following expression:

$$0 \leq n \leq 2^l \tag{2}$$

The integer n is generated by a random number generator. In expression (2), l is the number of collisions. The value l is stored in a counter or memory in a station which transmits a packet, and it is increased by one whenever the collision occurs and is cleared to zero when the transmission has been achieved. Thus, in the retransmission control system according to the BEB protocol, as the number of collisions increases, the retransmission interval is increased according to the average thereof.

In the case of FIG. 1, the first collision takes place between stations A and B, and therefore the integer n is 0 or 1. It is assumed that the stations A and B produce the second retransmission requests SR-Aw and SR-B2, for instance, in $1\tau$, and immediately start transmitting packets A2 and B2. In this case, the second collision takes place similarly, as in the above-described case. It is assumed that, as a result of this, the station A produces the third transmission request SR-A3 in $1\tau$ and the station B produces the third transmission request SR-B3 in $2\tau$. Furthermore, it is assumed that, before these transmission requests, SR-A3 and SR-B3, are made the station C has made a transmission request SR-C1 and has started transmitting a packet C1 as indicated at S-C1. If, as shown in FIG. 1, the transmission request SR-A3 is made after the station A has received the packet C1, the other stations cannot transmit their packets until transmission of the packet C1 has been accomplished. That is, the stations A and B wait until reception of packet C1 has been completed, and then start transmitting the packets A3 and B3 as indicated at S-A3 and S-B3, respectively. As a result, a collision of packets occurs with the stations A and B. When the collision of packets is detected, the stations A and B try to make their fourth try at packet transmissions. The above-described operation is repeatedly carried out. Thus, when a signal, transmitted by one station, is received by the other stations, no signal transmissions are carried out by the latter, as in the case of the packet C1 transmitted by the station C. The transmission of the latter station's packet can be achieved only after the signal transmission by the one station is completed.

As is apparent from the above description, in the conventional retransmission control system according to the BEB protocol, as the number of packet collisions increase, the retransmission intervals are gradually increased. Accordingly, if a plurality of stations make new transmission requests one after another under the condition that the channels are busy, then the stations are liable to initially, repeatedly transmit their packets at short retransmission intervals. This is, in the system, even if empty channels are available then and there, the collision of packets occurs sucessively with these channels, which lowers the channel utilization percentage.

SUMMARY OF THE INVENTION

In view of the foregoing, an object of this invention is to provide a retransmission control system in which the number of packet collisions is reduced, so that the percentage of channel utilization is increased.

In the invention, when a collision detecting circuit detects the collision of packets, the station which has transmitted the packet produces a random number. When a waiting period of time predetermined according to the random number has passed, a signal retransmission request is made. When the communication cable is being used, then the waiting period is increased as required. As a result, the retransmission interval can be made suitable according to the degree of channel congestion, to thereby increase the percentage of channel utilization.

BRIEF DESCRIPTION OF THE DRAWINGS

FIG. 4 is a time chart illustrating timing information for a retransmission control system according to a second embodiment of the invention.

DETAILED DESCRIPTION OF THE PREFERRED EMBODIMENTS

This invention will be described with reference to its preferred embodiments.

Figure 1:
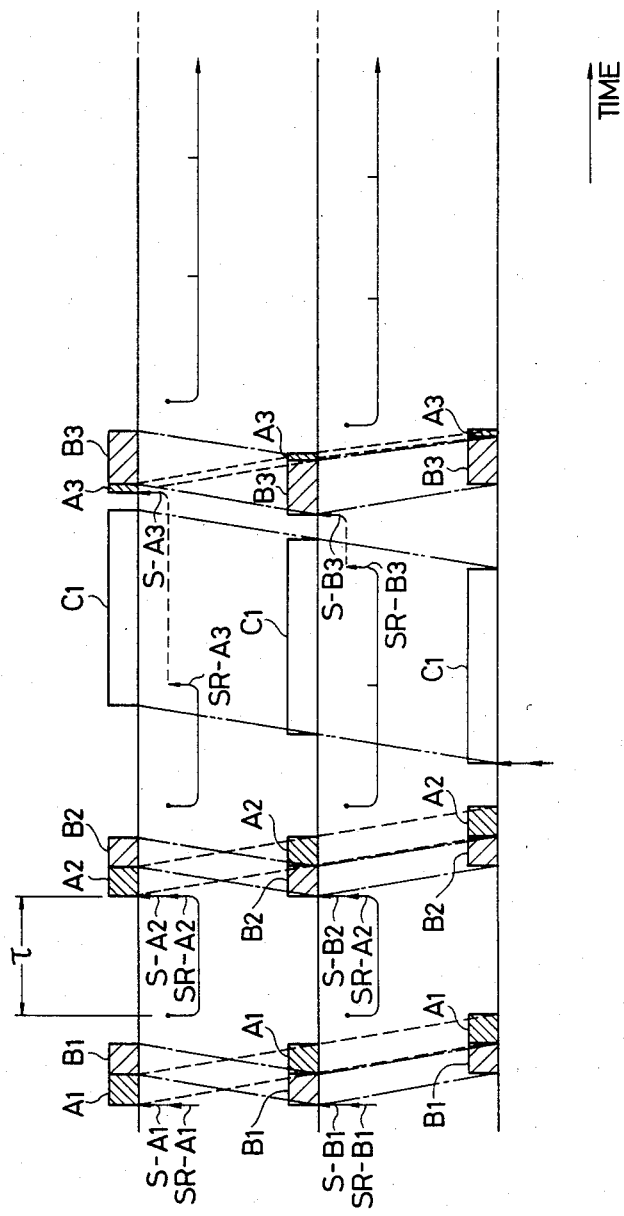
FIG. 1 is a time chart illustrating timing information for a conventional retransmission control system employing a BEB protocol.
Figure 2:
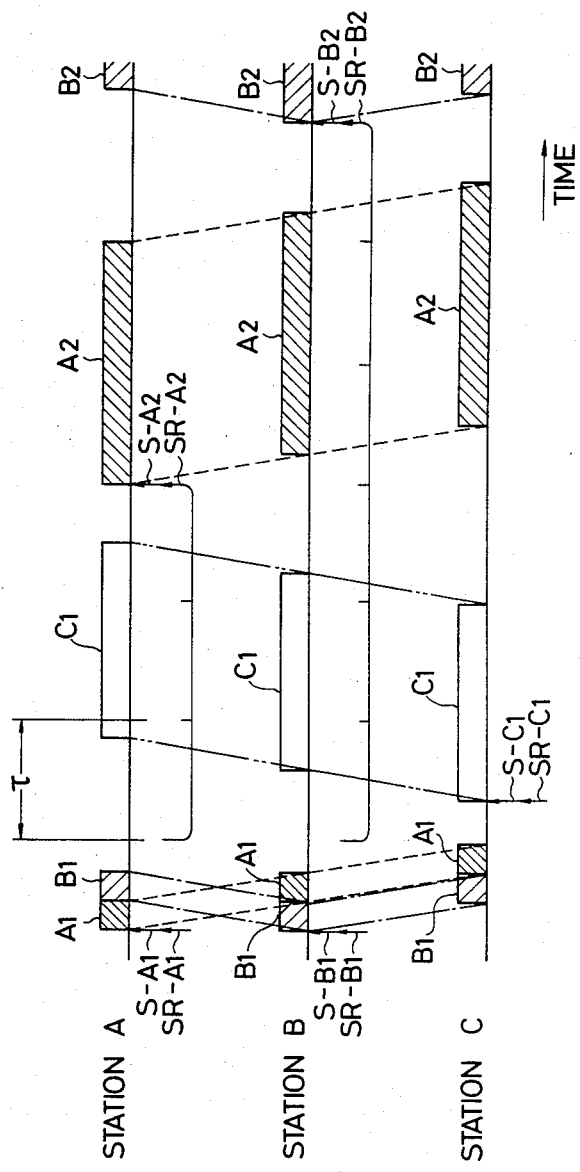
FIG. 2 is a time chart illustrating timing information for a retransmission control system according to a first embodiment of this invention.

FIG. 2 is a timing diagram for describing one embodiment of a retransmission control system according to the teachings of the invention. As in the conventional system described with reference to FIG. 1, stations A, B and C are connected to a communication cable. It is assumed that stations A and B have made transmission requests SR-A1 and SR-B1 to start transmitting packets A1 and B1 as indicated at S-A1 and S-B1, respectively.

Figure 3:
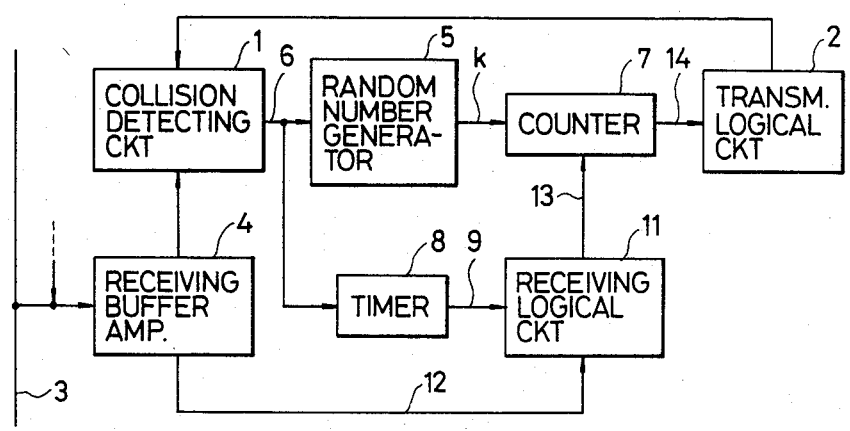
FIG. 3 is a block diagram showing the essential components for a retransmission control circuit according to a first embodiment of the invention.

FIG. 3 shows the essential components of one embodiment of retransmission control circuit according to the teaching of this invention. Each station is provided with such a retransmission control circuit. In each of the stations A and B, a collision detecting circuit 1 receives its own packet from a signal transmitting logical circuit 2 and the packet of the other station through a signal receiving buffer amplifier 4 which is transmitted through the coaxial cable 3, so that the first collision of packets is detected, and immediately the collision detecting circuit 1 applies a collision detection signal 6 to a random number generator 5. As a result, the random number generator 5 generates a random number k (k being a positive integer) in a predetermined range. The random number k is set in a counter 7.

The collision detection signal 6 is further applied to a timer circuit 8. The timer circuit 8 starts measuring time from the time instant when the collision detection signal 6 is applied, thereto, to output a carrier detecting signal 9. A signal receiving logical circuit 11 receives a reception signal 12 from the signal receiving buffer amplifier 4, and detects the presence or absence of a carrier when the carrier detecting signal 9 is applied thereto. When the packet of the other station is not received and the carrier is not detected, the signal receiving logical circuit 11 outputs a counting signal 13. In the counter 7, the count value is decreased by one whenever the signal 13 is applied thereto. When the carrier is detected, the signal is not outputted. When the count value of the counter reaches zero (0), a transmission request 14 is produced, whereby the signal transmitting logical circuit 2 starts an operation for retransmission.

It is assumed that, when the first collision of packets occurs, the random number generator 5 in the station A generates one (1), and the random number generator 5 in the station B generates two (2). These numerical values are set in the counters 7 of the stations A and B, respectively. It is assumed that, under the condition that the stations A and B are preparing for retransmission as described above, the station C produces a transmission request-C1 to start transmitting a packet C1 as indicated at S-C1. In this case, as long as the packet from station C is received by the station A, the signal receiving logical circuit 11 in the station A outputs no counting signal 13. That is, the count value in the counter 7 is maintained at one (1). The same thing can be said about the signal receiving logical circuit in the station B, and the count value in the counter 7 remains two (2).

When transmission of the packet C1 from station C has been accomplished, then in station A the signal receiving logical circuit 11 outputs the counting signal 13, so that the content of the counter 7 becomes zero and a transmission request SR-A2 is produced. In this operation, the station B does not yet start transmitting a packet B-2. If no carrier exists on the coaxial cable 3, the station A immediately starts transmitting a packet A2 as indicated at S-A2, thus establishing the calling.

On the other hand, in station B, the count value in counter 7 is reduced to one (1) from two (2) when the content of the counter 7 becomes zero in the station A. If no carrier exists on the coaxial cable 3 after the transmission of the packet A2 has been accomplished in the station A, the count value is changed to zero (0) and a transmission request SR-B2 is outputted with the timing that the counting signal 13 is outputted. Simultaneously, a packet B2 is transmitted as indicated at S-B2.

In the above-described embodiment, after the first collision of packets occurs, the stations A and B use the coaxial cable 3 efficiently in a time division manner, and therefore the channel utilization precentage is high.

FIG. 4 is a timing diagram for explaining the operation of a second embodiment of a retransmission control system according to the teaching of the present invention. As in the first embodiment shown in FIG. 2, stations A, B and C are connected to a communication cable. It is assumed that the stations A and B produce transmission requests SR-A1 and SR-B1 substantially at the same time, thus starting transmission of packets A1 and B1 as indicated as S-A1 and S-B1, respectively.

Figure 5:
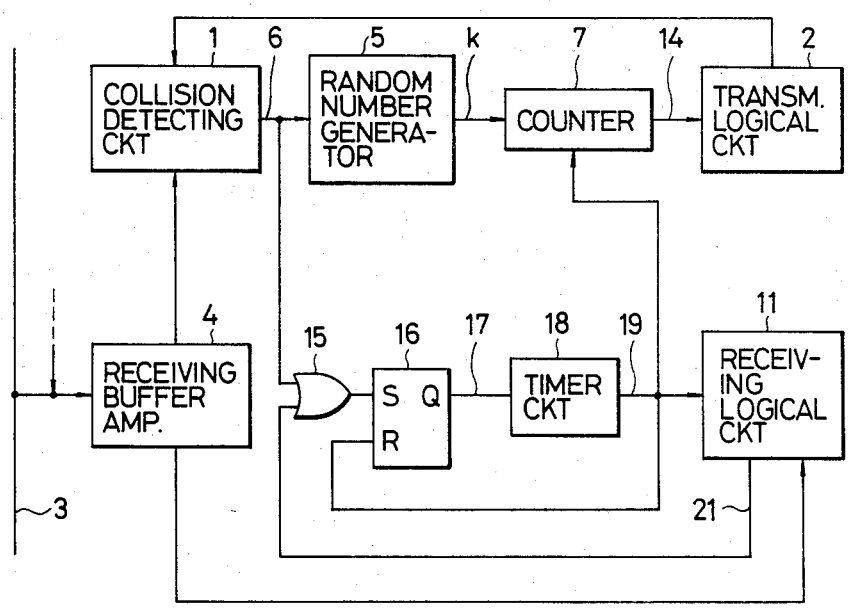
FIG. 5 is a block diagram showing the essential parts of a retransmission control circuit according to a second embodiment.

FIG. 5 shows the essential components of a second embodiment of a retransmission control circuit according to the teachings of the invention. Each station again being provided with such a retransmission control circuit. In FIG. 5, those components which have been described with reference to FIG. 3 are accordingly designated by the same reference numerals, and their detailed descriptions are omitted. When the collision detecting circuit 1 detects the collision of packets, the random number generator 5 receives the collision detection signal 6, to produce a random number k. The random number k is set in the counter 7.

The collision detection signal 6 is further applied through on OR circuit 15 to the set terminal S of a flip-flop circuit 16, to set the flip-flop. When the circuit 16 is set, a counting signal 17 is provided at the output terminal Q and a timer circuit 18 starts its time-counting operation. When the slot $\tau$ has been counted, the timer circuit 18 outputs a time-counting completion signal 19. The signal 19 is applied to the counter 7, so that the count value of the counter 7 is reduced by one (1). The signal 19 is further applied to the reset terminal R of the flip-flop circuit 16, to reset the flip-flop. The signal 19 is further applied to the signal receiving logical circuit 11, whereupon the circuit 11 detects whether or not the carrier is being received. When no carrier is received, the circuit 11 outputs a time-counting restart signal 21. When the carrier is received, the circuit 11 outputs ths signal 21 only after the carrier has been terminated. The time-counting restart signal 21 is applied through the OR circuit 15 to the flip-flop circuit 16, to thereby set the flip-flop. When the flip-flop circuit 16 is set, the above-described operation is carried out, so that the content of the counter 7 is further reduced by one (1). When the count value of the counter 7 reaches zero (0), the transmission request 14 is produced. Thus, the signal transmitting logical circuit 2 starts a retransmission operation.

It is assumed that, as in the first embodiment, in response to the first collision of packets the random number generator 5 in the station A generates one (1) and the random number generator 5 in the station B generates two (2). These numerical values are set in the counters 7 in these stations. At the same time, the timer circuits 18 in the stations A and B start the time-counting operations. The contents of the counters 7 in stations A and B are reduced by one (1) after the slot time $\tau$ has been counted. As a result, the count value of the counter 7 in station A becomes zero (0), and the transmission request SR-A2 is provided. It is assumed that transmission of packet C1 has been started before the transmission request is provided. In this case, the station A starts transmitting the packet A2 as indicated at S-A2 when the transmission of the packet C1 has been accomplished.

On the other hand, in the station B, the count value becomes one (1) when the count value of the counter 7 in the station A becomes zero (0). In this operation, the signal receiving logical circuit 11 in station B detects the carrier of the packet C1 of station C. Accordingly, the station B outputs the time-counting restart signal 21 after the carrier is terminated, whereby the flip-flop circuit 16 is set again in the station B and the timer circuit 18 starts its operation. When the slot time $\tau$ has been counted, the count value of the counter 7 in the station B becomes zero (0) and the transmission request SR-B2 is produced. At this time instant, the packet A2 of the station A is being transmitted. Therefore, transmission of the packet B2 of the station B is started (as indicated at S-B2) when the transmission of the packet A2 is accomplished.

Figure 6:
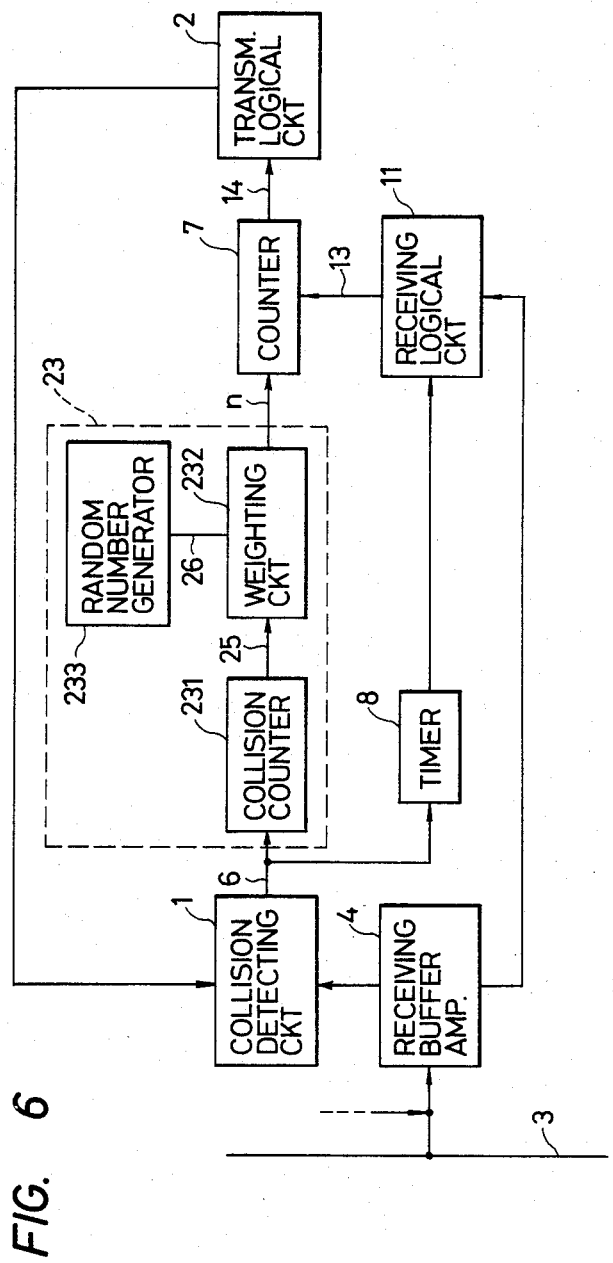
FIG. 6 is a block diagram showing the essential components of a circuit located at each station, forming a third embodiment of the invention.

FIG. 6 is a diagram of a retransmission control circuit according to a third embodiment of the invention. In the case where a number of stations are connected to one communication cable, packet collisions may be frequent during time of frequent communications between stations. In the case when the collision of packet occurs repeatedly, the probability that packets collide with one another during an empty period of time can be reduced by increasing the maximum value of the retransmission interval of each station according to the repetitivity of packet collision. Accordingly, in the case where the degree of channel congestion is high, it is effective to use a retransmission control system based on the BEB protocol.

FIG. 6 shows the essential components, at each station, of such a retransmission control system. In FIG. 6, a collision detecting circuit 1 detects the collision of packets from the time relation between the packet which is sent from the signal transmitting logical circuit 2 of its own station and the packet of another station which is received through a coaxial cable 3. Upon detection of the collision, the collision detecting circuit 1 applies a collision detection signal 6 to a collision counter 231 in a BEB retransmission control section 23. The content of the collision counter 231 is cleared when the packet is firstly transmitted, and thereafter the collision counter 231 counts the number of packet collisions with the aid of the collision detection signal 6. When the first collision of packets occurs, the collision counter 231 counts one (1) which is the number of packet collisions. A count value signal 25, which represents the count in the counter 231, is applied to a weighting circuit 232. The weighting circuit 232, receiving a random number 26 from a random number generator 233, obtains an integer n which satisfies the above-described expression (2). The integer n is set, as a weighted numberical value, in a counter 7. Thereafter, the circuit operates as in the first embodiment.

The third embodiment described herein may be modified in various manners. One of the modifications is a retransmission control system which is provided by combining the second embodiment with the BEB protocol. This system can be obtained by modifying the system shown in FIG. 5 in such a manner that the random number generator 5 is replaced by the BEB restransmission control section 23, and therefore its operation can be readily understood. Another modification is a retransmission control system in which the weighting circuit 232 performs weighting in combination with other parameters. Examples of the parameters are the kind and importance of a message transmitted by a station. In transmitting a long message, it is ofter better to increase the weight to make the retransmission interval longer. The same thing may be said about a message low in importance. On the other hand, for a message the transmission delay time of which may cause trouble, weighting should be so carried out that the retransmission interval is as short as possible.

The case where the retransmission control system of the invention is applied to a communication system called "Modified Ethernet," will be described as a fourth embodiment of the invention. First, the communication system will be generally described.

Figure 7:
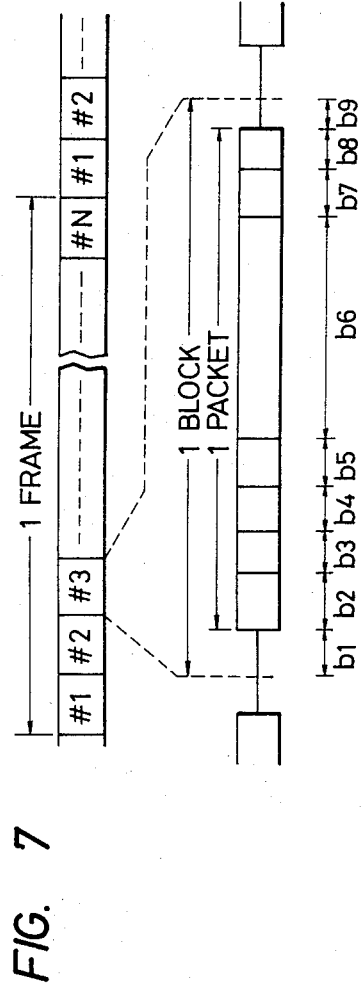
FIG. 7 is an explanatory diagram of the frame contents in a communication system called "Modified Ethernet."

FIG. 7 shows the contents of signal frames in the modified ethernet. The frame, which occurs periodically in time, consists of N blocks, #1 through #N. Each block consists of various bit trains $b_1$ through $b_9$ as listed below:

- $b_1$: rear guard time
- $b_2$: preamble
- $b_3$: address bit
- $b_4$: distance code bit
- $b_5$: control bit
- $b_6$: data bit
- $b_7$: check bit
- $b_8$: end flag
- $b_9$: front guard bit The bit trains $b_2$ through $b_5$, $b_7$ and $b_8$ are necessary for forming a packet, and are generally called "overhead (additional) bits." The bit trains $b_1$ through $b_9$ are, in combination, called "guard time." The "guard time" is the empty bit trains for preventing overlap of adjacent packets which may occur because of the delay time which occurs when block packets are transmitted over the coaxial cable. That is, the rear guad time $b_1$ is to protect a packet which is located after it, and the front guard time $b_9$ is to protect a packet which is located before it.

Figure 8:
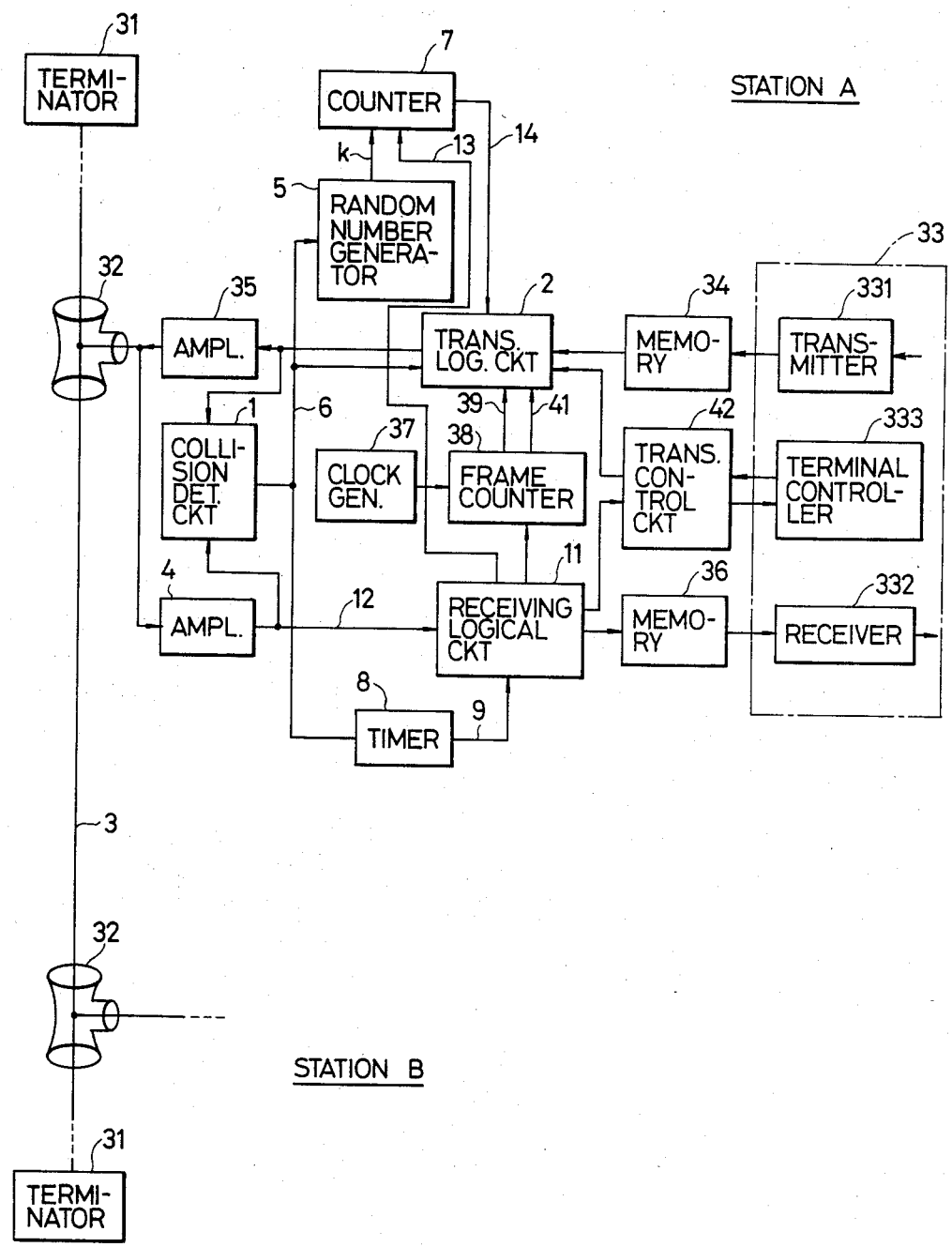
FIG. 8 is a block diagram showing the circuit at each station, forming a fourth embodiment of the invention.

FIG. 8 is a block diagram outlining the arrangement of a communication system according to the above-described modified ethernet. The system has a coaxial cable as a transmission path which is connected between impedance matching terminators 31 having a resistance equal to the characteristic impedance. A number of stations are connected through T-connectors (taps) 32 to the coaxial cable 3. These stations are fundamentally the same in construction, and only the essential components of the station A are shown in FIG. 8.

Each station has a subscriber device 33 provided with a computer and a telephone set. The subscriber device 33 comprises: a transmitter (encoder) 331 for transmitting a digital signal as a packet to another station; a receiver (decoder) 332 for receiving a digital signal as a packet from another station; and a terminal controller 333 for controlling a terminal. The output signals of the transmitter 331 are temporarily stored in a signal transmitting buffer memory 34. The output signals thus stored are collectively read at a predetermined time instant with the aid of a clock signal, the period of which is equal to the transmission speed of the signal on a transmission medium, namely, a coaxial cable 3. The signals thus read are converted into a packet by a signal transmitting logical circuit 2. The packet is applied through a signal transmitting buffer amplifier 35 and the T-connector 32 to the coaxial cable 3.

On the other hand, all the packets which are transmitted through the coaxial cable 3 are applied through the T-connector 32 to a signal receiving buffer amplifier 4. A signal receiving logical circuit 11 selects only a packet applied to its own station out of the packets thus received. The packet thus selected is temporarily stored in a signal receiving buffer memory 36. The signal thus stored is continuously read by a receiver 332 with the aid of a predetermined clock signal, as a result of which an output signal is obtained.

The signals are transmitted and received as described above. A transmission clock signal used in this operation is generated by a transmission clock generator 37. A frame counter 38 subjects the transmission clock signal to frequency division, to form a frame timing signal 39 and a block timing signal 41 which specify frame timing and block timing, respectively. A transmission control circuit 43 controls a terminal controller 333 according to a signal applied to its own station, and conrols the signal transmitting logical circuit 2 according to instructions from the terminal controller 333.

In the retransmission control system according to the modified ethernet, a timer circuit 8 preferably counts a period of time corresponding to one block length as a slot time $\tau$. This time-counting operation causes the signal receiving logical circuit 11 to detect the presence or absence of the carrier for every block. Whenever an empty block is detected, a counting signal 13 is supplied to a counter 7. When the counter value of the counter 7 is decreased to zero, a transmission request signal 14 is produced, so that an operation for retransmission is started. This retransmission control system is theoretically the same as the first embodiment.

A restransmission control system similar to the second embodiment may also be applied to the modified ethernet. In the modified ethernet, a particular block in a frame which occurs periodically on the time axis can be continually possessed by one station, and real time transmission of voice signals or the like can be achieved. In the real time transmission of voice data or picture data, it is frequently required to possess one or a plural blocks for a long period of time. Accordningly, it is advantageous for teh effective use of channels that in the case of the other data (code data) the retransmission interval is made short, while in the case of the voice data or picture data the retransmission interval is made long with the period of time required for achieving the calling being sacrificed. In view of this, in the case where the retransmission control system according to the third embodiment is applied to the modified ethernet, it is effective that the weighting operation by the weighting circuit is varried according to the contents of the data.

In the fourth embodiment in FIG. 8, the carrier is detected whenever the slot time (block time) passes; however, a system different from this may be employed. That is, the subscriber device 33 is provided with a memory for indicating the possession of blocks, so that empty blocks occurring after the block where the collision of packets takes place are estimated, to reduce the count value. More specifically, the count value is reduced according to the possession of blocks in the preceding frame, and the number of a block where the count value becomes zero is stored, so that the transmission request is produced with that block number in the following frame.

The modified ethernet is a communication system in which communication is carried out with blocks appointed. Therefore, in the modified ethernet, if a block is empty, then the probability is high that the same block in the next frame is empty. Accordingly, the retransmission control system in which only empty blocks (empty slots) are counted without taking blocks used into account is considerabley effective for the modified ethernet, and can provide the most suitable retransmission intervals according to the degree of channel congestion.

As is apparent from the above description, according to the invention, the time-counting operation for measuring the retransmission interval is limited when the communication cable is being use. Therefore, the retransmission can be carried out with time intervals corresponding with the degree of channel congestion.

What is claimed:

1. In a multi-station communication network in which a plurality of stations connected through taps to a communication cable transmit digital signals multiplexed in a time division manner to thereby transmit signals in time channels, a retransmission control system comprising a plurality of retransmission control circuits, a control circuit being associated with each station and comprising:

collision detecting means for detecting when at least two of said stations simultaneously transmit digital signals to said communication cable causing collision of said digital signals;

waiting time setting means for stopping transmission of the digital signal generated by the station associated with the control circuit when a collision is detected, and for initiating a waiting time before retransmitting said signal; and waiting time adjusting means for increasing said waiting time when said communication cable is used by another station during said waiting time, whereby the retransmission interval of said digital signal is controlled according to the degree of congestion of the digital signals transmitted over said communication cable.

2. A system as claimed in claim 1 wherein each of said control circuits further include:

a random number generator for generating a random number in a predetermined range; and a counter means in which a random number generated by said random number generator is set, for causing signal retransmission when the count in said counter means assumes a predetermined value; and means responsive to said waiting time setting means, for causing the count in said counter means to be changed at the conclusion of each waiting time irrespective of whether or not an empty channel is available.

3. A system as claimed in claim 1, wherein each of said control circuits further includes:

a random number generator for generating a random number in a predetermined range; and a counter means in which a random number generated by said random number generator is set, for causing signal retransmission when the count in said counter means assumes a predetermined value, and circuit means responsive to said waiting time setting means, for causing the count in said counter to be changed when an empty channel is detected by said circuit means and for maintaining the count in said counter means when an empty channel is not available.

4. A system as claimed in claim 1 further including a random number generator means for setting a random number in accordance with a BEB protocol.

5. A system as claimed in claim 1, wherein said digital signals are transmitted in units of time block, a plurality of said blocks forming a frame, said frame being periodically repeated and wherein said waiting time adjusting means further includes means for predicting an empty block, said predicting means including means for detecting the status of said time blocks, decision means for predicting the occurrence of empty time blocks and means for adjusting the waiting time according to the status of empty blocks thus predicted.

* * * * *